United States Patent Office 2,792,356
Patented May 14, 1957

2,792,356

PROCESS FOR BREAKING PETROLEUM EMULSIONS EMPLOYING CERTAIN POLYEPOXIDE MODIFIED OXYALKYLATION DERIVATIVES, SAID DERIVATIVES OBTAINED IN TURN BY OXYALKYLATION OF PHENOL - ALDEHYDE RESINS

Melvin De Groote, University City, and Kwan-Ting Shen, Brentwood, Mo., assignors to Petrolite Corporation, Wilmington, Del., a corporation of Delaware No Drawing. Application November 19, 1953, Serial No. 393,223

20 Claims. (Cl. 252—331)

The present application is a continuation-in-part of our co-pending application, Serial No. 349,972, filed April 20, 1953. Said aforementioned co-pending application is concerned with a process for breaking petroleum emulsions of the water-in-oil type employing a demulsifier including the reaction products of (A) certain oxyalkylated phenol aldehyde resins, therein described in detail, and (B) certain nonaryl hydrophile polyepoxides, also therein described in detail, the ratio of reactant (A) to reactant (B) being in the proportion of 2 moles of (A) to one mole of (B).

The present invention relates to a process for breaking petroleum emulsions of the water-in-oil type employing a demulsifier including the reaction products of the above described reactants, (A) and (B), which are hereinafter described in detail, the ratio of reactant (A) to reactant (B), however, being in the proportion of 4 moles of (A) to 3 moles of (B).

The present application thus differs from the aforementioned application in that one obtains products having at least twice the molecular weight by the use of a molal ratio of 4 moles of (A) to 3 moles of (B). Specifically, the product described in aforementioned co-pending application may be indicated thus:

A—B—A

In contradistinction the products herein described and useful for the resolution of petroleum emulsions may be indicated thus:

A—B—A—B—A—B—A

Products may be obtained by either a continuous process involving the two reactants or, if desired, by a 2-step method in which the final product described in aforementioned co-pending application becomes an intermediate and is combined by means of another mole of (B), in ratio of two moles of intermediate to one mole of (B), thus:

2(A—B—A)+B→A—B—A—B—A—B—A

In our co-pending application, Serial No. 393,224, filed November 19, 1953, reference is made to another product in which two different polyepoxides are employed; in other words, if the one described above is referred to as (B) and is essentially hydrophile in character, then in comparison our aforementioned co-pending application, Serial No. 393,224, is concerned with a combination obtained by a stepwise process comparable to the one last mentioned above in which final addition of (B) is replaced by the addition of a hydrophobe polyepoxide and thus is illustrated in the following manner:

2(A—B—A)+C→A—B—A—C—A—B—A

For an obvious reason, to wit, ease of comparison with both of the two aforementioned applications, Serial No. 349,972 and Serial No. 393,224, we are describing the 2-step process of manufacture although obviously the two steps could be fused or combined to be a single step, provided the same polyepoxide or the same type of polyepoxide, for instance, an essentially hydrophobe polyepoxide, is used. The single step procedure is illustrated subsequently.

As has been pointed out in our aforementioned co-pending application, Serial Number 337,884, filed February 19, 1953, there are two types of polyepoxides, particularly diepoxides, one being, for example characterized by the formula:

wherein R represents the divalent hydrocarbon radical of a dihydric phenol and n is an integer of the series 0, 1, 2, 3, etc. More specifically, such diglycidyl ethers may be illustrated by the following formula:

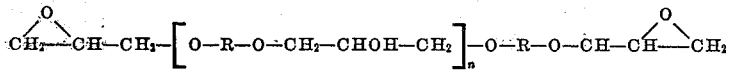

wherein n is an integer of the series 0, 1, 2, 3, etc.

In contradistinction to such diglycidyl ethers which introduce an essentially hydrophobe radical or radicals, the present invention is characterized by analogous compounds derived from diglycidyl ethers which do not introduce any hydrophobe properties in its usual meaning but in fact are more apt to introduce hydrophile properties. Thus, the diepoxides employed in the present invention are characterized by the fact that the divalent radical connecting the terminal epoxide radicals contains less than 5 carbon atoms in an interrupted chain. For instance, a simple member and one of the most readily available members of the class of diepoxides described in our co-pending application, Serial No. 324,814, filed December 8, 1952, is

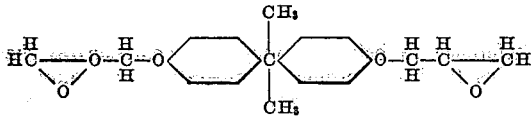

It is to be noted in this formula the terminal epoxy radicals are separated by the divalent hydrophobe group

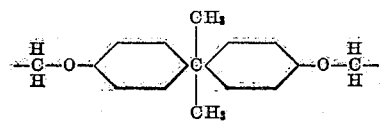

The diepoxides employed in the present process are obtained from glycols such as ethylene glycol, diethylene glycol, propylene glycol, dipropylene glycol, tripropylene glycol, butylene glycol, dibutylene glycol, tributylene glycol, glycerol, diglycerol, triglycerol, and similar compounds. Such products are well known and are characterized by the fact that there are not more than 4 uninterrupted carbon atoms in any group which is part of the radical joining the epoxide groups. Of necessity such diepoxides must be non-aryl or aliphatic in character. The diglycidyl ethers of our co-pending application, Serial No. 324,814, filed December 8, 1952, are invariably and inevitably aryl in character.

The diepoxides employed in the present process are usually obtained by reacting a glycol or equivalent compounds, such as glycerol or diglycerol with epichlorohydrin and subsequently with an alkali. Such diepoxides have been described in the literature and particularly the patent literature. See, for example, Italian Patent 400,973, dated August 8, 1951; see, also, British Patent 518,057, dated December 10, 1938; and U. S. Patent No. 2,070,990; dated February 16, 1937, to Groll et al. Reference is made also to U. S. Patent No. 2,581,464, dated January 8, 1952, to Zech. This particular last mentioned patent describes a composition of the following general formula:

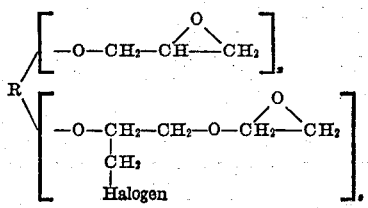

in which $x$ is at least 1, $z$ varies from less than 1 to more than 1, and $x$ and $z$ together are at least 2 and not more than 6, and R is the residue of the polyhydric alcohol remaining after replacement of at least 2 of the hydroxyl groups thereof with the epoxide ether groups of the above formula, and any remaining groups of the residue being free hydroxyl groups.

It is obvious from what is said in the patent that variance can be obtained in which the halogen is replaced by a hydroxyl radical; thus the formula would become

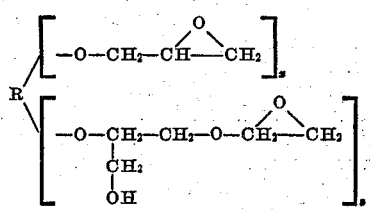

Reference to being thermoplastic characterizes them as being liquids at ordinary temperature or readily convertible to liquids by merely heating below the point of pyrolysis and thus differentiates them from infusible resins. Reference to being soluble in an organic solvent means any of the usual organic solvents such as alcohols, ketones, esters, ethers, mixed solvents, etc. Reference to solubility is merely to differentiate from a reactant which is not soluble and might be not only insoluble but also infusible. Furthermore, solubility is a factor insofar that it is sometimes desirable to dilute the compound containing the epoxy rings before reacting with a resin as described. In such instances, of course, the solvent selected would have to be one which is not susceptible to oxyalkylation, as, for example, kerosene, benzene, toluene dioxane, various ketones, chlorinated solvents, dibutyl ether, dihexyl ether, ethyleneglycol diethylether, diethylglycol diethylether, and dimethoxytetraethyleneglycol.

The expression "epoxy" is not usually limited to the 1,2-epoxy ring. The 1,2-epoxy ring is sometimes referred to as the oxirane ring to distinguish it from other epoxy rings. Hereinafter the word "epoxy" unless indicated otherwise, will be used to mean the oxirane ring i. e., the 1,2-epoxy ring. Furthermore, where a compound has two or more oxirane rings they will be referred to as polyepoxides. They usually represent, of course, 1,2-epoxide rings or oxirane rings in the alpha-omega position. This is a departure, of course, from the standpoint of strictly formal nomenclature as in the example of the simplest diepoxide which contains at least 4 carbon atoms and is formally described as 1,2-epoxy-3,4-epoxy-butane (1,2,3,4 diepoxybutane).

It well may be that even though the previously suggested formula represents the principal component, or components, of the resultant or reaction product described in the previous text, it may be important to note that somewhat similar compounds, generally of much higher molecular weight, have been described as complex resinous epoxides which are polyether derivatives of polyhydric phenols containing an average of more than one epoxide group per molecule and free from functional groups other than epoxide and hydroxyl groups. See U. S. Patent No. 2,494,295, dated January 10, 1950, to Greenlee. The compounds here included are limited to the monomers or the low molal members of such series and generally contain two epoxide rings per molecule and may be entirely free from a hydroxyl group. This is important because the instant invention is directed toward products which are not insoluble resins and have certain solubility characteristics not inherent in the usual thermosetting resins. Note, for example, that U. S. Patent No. 2,494,295 describes products wherein the epoxide derivative can combine with a sulfonamide resin. The intention in said U. S. Patent 2,494,295, of course, is to obtain ultimately a suitable resinous product having the characteristics of a comparatively insoluble resin. Simply for purpose of illustration to show a typical diglycidyl ether of the kind herein employed, reference is made to the following formula:

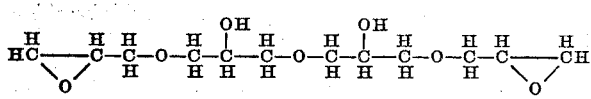

or if derived from cyclic diglycerol the structure would be thus:

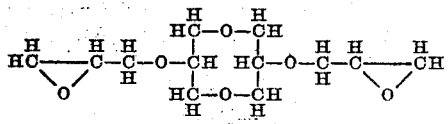

or the equivalent compound wherein the ring structure involves only six atoms thus:

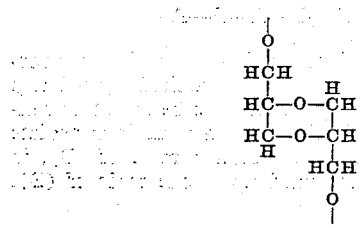

Commercially available compounds seem to be largely to the former with comparatively small amounts, in fact comparatively minor amounts, of the latter.

Having obtained a reactant having generally 2 epoxy rings as depicted in the next to last formula preceding, or low molal polymers thereof, it becomes obvious the reaction can take place with any oxyalkylated phenolaldehyde resin by virtue of the fact that there are always present either phenolic hydroxyls or their alkanol radicals or the equivalent or alkanol radicals in the presence of any phenolic hydroxyl. Indeed, the products obtained by oxyalkylation of the phenolic resins must invariably and inevitably be oxyalkylation-susceptible.

To illustrate the products useful in the process of the present invention, reference will be made to a reaction involving a mole of the oxyalkylating agent, i. e., the compound having two oxirane rings and an oxyalkylated resin. Proceeding with the example previously described, it is obvious the reaction ratio of two moles of the oxyalkylated resin to one mole of the oxyalkylating agent gives a product which may be indicated as follows:

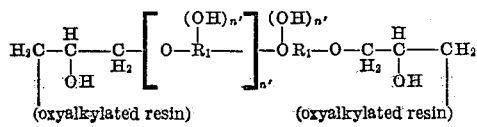

in which $n'$ is a small whole number less than 10, and usually less than 4, and including 0, and $R_1$ represents a dilvalent radical as previously described being free from any radical having more than 4 uninterrupted carbon atoms in a single chain, and the characterization "oxyalkylated resin" is simply an abbreviation for the oxyalkylated resin which is described in greater detail subsequently.

Such products must be soluble in suitable solvents such as a non-oxygenated hydrocarbon solvent or an oxygenated hydrocarbon solvent or, for that matter, a mixture of the same with water. Needless to say, after the resin has been treated with a large amount of ethylene oxide, the products are water soluble and may be soluble in an acid solution.

The purpose in this instance is to differentiate from insoluble resinous materials, particularly those resulting from relation or cross-linking. Not only does this property serve to differentiate from instances where an insoluble material is desired, but also serves to emphasize the fact that in many instances the preferred compounds have distinct water-solubility or are distinctly soluble in 5% acetic acid. For instance, the products freed from any solvent can be shaken with five to twenty times their weight of distilled water at ordinary temperature and are at least self-dispersing, and in many instances water-soluble, in fact, colloidally soluble.

Basic nitrogen atoms can be introduced into such derivatives by use of a reactant having both a nitrogen group and a 1,2-epoxy group, such as 3-dialkylamino-epoxy-propane. See U. S. Patent No. 2,520,093, dated August 22, 1950, to Gross.

As far as the use of the herein described products goes for the purpose of resolving petroleum emulsions of the water-in-oil type, we prefer to employ oxyalkylated derivatives, which are obtained by the use of monoepoxides, in such manner that the derivatives so obtained have sufficient hydrophile character to meet at least the test set forth in U. S. Patent No. 2,499,368, dated March 7, 1950, to De Groote, et al. In said patent such test for emulsification using a water-insoluble solvent, generally xylene, is described as an index of surface activity.

In the present instance the various oxyalkylated derivatives obtained particularly by use of ethylene oxide, propylene oxide, etc., may not necessarily be xylene-soluble although they are xylene-soluble in a large number of instances. If such compounds are not xylene-soluble the obvious chemical equivalent, or equivalent chemical test, can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test obviously is the same for the reason that there will be two phases on vigorous shaking and surface activity makes its presence manifest. It is understood the reference in the hereto appended claims as to the use of xylene in the emulsification test includes such obvious variant.

Reference is made again to U. S. Patent No. 2,499,368, dated March 7, 1950, to De Groote and Keiser. Attention is directed to that part of the text which appears in columns 28 and 29, lines 12 through 75, and lines 1 through 21, respectively. Reference is made to this text with the same force and effect as if it were herein included. This, in essence, means that the preferred product for resolution of petroleum emulsions of the water-in-oil type is characterized by the fact that a 50-50 solution in xylene, or its equivalent, when mixed with one to three volumes of water and shaken will produce an emulsion.

For purpose of convenience, what is said hereinafter will be divided into five parts, with Part 4, in turn, being divided into two subdivisions:

Part 1 is concerned with the hydrophile non-aryl polyepoxides, and particularly diepoxides, employed as reactants;

Part 2 is concerned with suitable phenol-aldehyde resins to be employed for reaction with the epoxides;

Part 3 is concerned with the oxyalkylation of the previously described phenol-aldehyde resins;

Part 4, Subdivision A, is concerned with the two-step procedure involving reaction between the two preceding types of materials and examples obtained by such reactions. It involves in essence preparation of an intermediate between 2 moles of the oxyalkylated phenol-aldehyde resin and one mole of the diglycidyl ether, for example (identical with the products described in aforementioned co-pending application, Serial No. 349,972) followed by a second step in which 2 moles of these larger molecules are combined with use of a single mole of a diglycidyl ether or the like;

Part 4, Subdivision B, is a single step procedure resulting in substantially the same compounds by the use of 4 moles of the oxyalkylated phenol-aldehyde resin and 3 moles of the diglycidyl ether, or the equivalent;

Part 5 is concerned with the resolution of petroleum emulsions of the water-in-oil type by means of the previously described chemical compounds or reaction products.

PART 1

Reference is made to prevous patents as illustrated in the manufacture of the non-aryl polyepoxides and particularly diepoxides employed as reactants in the instant invention. More specifically, such patents are the following: Italian Patent No. 400,973, dated August 8, 1941; British Patent No. 518,057, dated December 10, 1938; U. S. Patent No. 2,070,990, dated February 16, 1937, to Groll et al.: and U. S. Patent No. 2,581,464, dated January 8, 1952, to Zech. The simplest diepoxide is probably the one derived from 1,3-butadiene or isoprene. Such derivatives are obtained by the use of peroxides or by other suitable means and the diglycidyl ethers may be indicated thus:

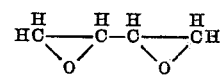

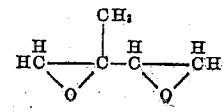

In some instances the compounds are essentially derivatives of etherized epichlorohydrin or methyl epichlorohydrin. Needless to say, such compounds can be derived from glycerol monochlorohydrin by etherization prior to ring closure. An example is illustrated in the previously mentioned Italian Patent No. 400,973:

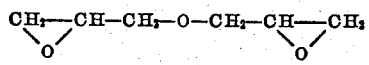

Another type of diepoxide is diisobutenyl dioxide as described in aforementioned U. S. Patent No. 2,070,990, dated February 16, 1937, to Groll, and is of the following formula:

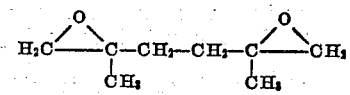

The diepoxides previously described may be indicated by the following formula:

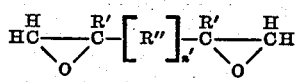

in which R' represents a hydrogen atom or methyl radical and R'' represents the divalent radical uniting the two terminal epoxide groups, and n' is the numeral 0 or 1. As previously pointed out, in the case of the butadiene derivative, n' is 0. In the case of diisobutenyl dioxide R'' is CH₂CH₂ and n' is 1. In another example previously referred to R'' is CH₂OCH₂ and n' is 1.

However, for practical purposes the only diepoxide available in quantities other than laboratory quantities is a derivative of glycerol or epichlorohydrin. This particular diepoxide is obtained from diglycerol which is largely acyclic diglycerol, and epichlorohydrin or equivalent thereof, in that the epichlorohydrin itself may supply the glycerol or diglycerol radical in addition to the epoxy rings. As has been suggested previously, instead of starting with glycerol or a glycerol derivative, one could start with any one of a number of glycols or polyglycols and it is more convenient to include as part of the terminal oxirane ring radical the oxygen atom that was derived from epichlorohydrin or, as might be the case, methyl epichlorohydrin. So presented the formula becomes:

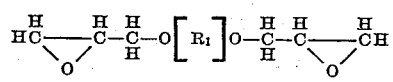

In the above formula R₁ is selected from groups such as the following:

C₂H₄
C₂H₄OC₂H₄
C₂H₄OC₂H₄OC₂H₄
C₃H₆
C₃H₆OC₃H₆
C₃H₆OC₃H₆OC₃H₆
C₄H₈
C₄H₈OC₄H₈
C₄H₈OC₄H₈OC₄H₈
C₃H₅(OH)
C₃H₅(OH)OC₃H₅(OH)
C₃H₅(OH)OC₃H₅(OH)OC₃H₅(OH)

It is to be noted that in the above epoxides there is a complete absence of (a) aryl radicals and (b) radicals in which 5 or more carbon atoms are united in a single uninterrupted single group. R₁ is inherently hydrophile in character as indicated by the fact that it is specified that the precursory diol or polyol HOROH must be water-soluble in substantially all proportions, i. e., water miscible.

Stated another way, what is said previously means that a polyepoxide such as

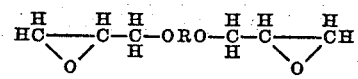

is derived actually or theoretically, or at least derivable, from the diol HOROH, in which the oxygen-linked hydrogen atoms were replaced by

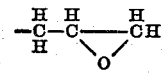

Thus, R(OH)ₙ, where n represents a small whole number which is 2 or more, must be water-soluble. Such limitation excludes polyepoxides if actually derived, or theoretically derived at least, from water-insoluble diols or water-insoluble diols or water-insoluble triols or higher polyols. Suitable polyols may contain as many as 12 to 20 carbon atoms or thereabouts.

Referring to a compound of the type above in the formula

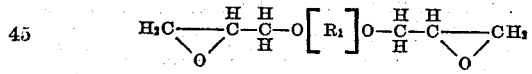

in which R₁ is C₃H₅(OH), it is obvious that reaction with another mole of epichlorohydrin with appropriate ring closure would produce a triepoxide or, similarly, if R happened to be C₃H₅(OH)OC₃H₅(OH), one could obtain a tetraepoxide. Actually, such procedure generally yields triepoxides, or mixtures with higher epoxides and perhaps in other instances mixtures in which diepoxides are also present. Our preference is to use the diepoxides.

There is available commercially at least one diglycidyl ether free from aryl groups and also free from any radical having 5 or more carbon atoms in an uninterrupted chain. This particular diglycidyl ether is obtained by the use of epichlorohydrin in such a manner that approximately 4 moles of epichlorohydrin yield one mole of the diglycidyl ether, or, stated another way, it can be considered as being formed from one mole of diglycerol and 2 moles of epichlorohydrin so as to give the appropriate diepoxide. The molecular weight is approximately 370 and the number of epoxide groups per molecule are approximately 2. For this reason in the first of a series of subsequent examples this particular diglycidyl ether is used, although obviously any of the others previously described would be just as suitable. For convenience, this diepoxide will be referred to as diglycidyl ether A. Such material corresponds in a general way to the previous formula.

Using laboratory procedure we have reacted diethyleneglycol with epichlorohydrin and subsequently with alkali so as to produce a product which, on examination, corresponded approximately to the following compound:

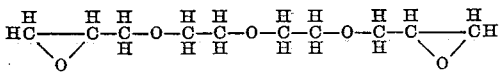

The molecular weight of the product was assumed to be 230 and the product was available in laboratory quantities only. For this reason, the subsequent table referring to the use of this particular diepoxide, which will be referred to as diglycidyl ether B, is in grams instead of pounds.

Probably the simplest terminology for these polyepoxides, and particularly diepoxides, to differentiate from comparable aryl compounds, is to use the terminology "epoxyalkanes" and, more particularly, polyepoxyalkanes or diepoxyalkanes. The difficulty is that the majority of these compounds represent types in which a carbon atom chain is interrupted by an oxygen atom and, thus, they are not strictly alkane derivatives. Furthermore, they may be hydroxylated or represent a heterocyclic ring. The principal class properly may be referred to as polyepoxypolyglycerols, or diepoxypolyglycerols.

Other examples of diepoxides involving a heterocyclic ring having, for example, 3 carbon atoms and 2 oxygen atoms, are obtainable by the conventional reaction of combining erythritol with a carbonyl compound, such as formaldehyde or acetone so as to form the 5-membered ring, followed by conversion of the terminal hydroxyl groups into epoxy radicals.

PART 2

This part is concerned with the preparation of phenol-aldehyde resins of the kind described in detail in U. S. Patent No. 2,499,370, dated March 7, 1950, to De Groote and Keiser, with the following qualifications: said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially para-tetradecylphenol, commercially available. Similarly, resins can be prepared from hexadecylphenol or octadecylphenol. This feature will be referred to subsequently.

In addition to U. S. Patent No. 2,499,370, reference is made also to the following U. S. Patents: Nos. 2,499,365; 2,499,366; and 2,499,367, all dated March 7, 1950 to De Groote and Keiser. These patents, along with the other two previously mentioned patents, describe phenolic resins of the kind herein employed as initial materials.

For practical purposes, the resins having 4 to 12 carbon atoms are most satisfactory, with the additional $C_{14}$ carbon atom also being very satisfactory. The increased cost of the $C_{16}$ and $C_{18}$ carbon atom phenol renders these raw materials of less importance, at least at the present time.

Patent 2,499,370 describes in detail methods of preparing resins useful as intermediates for preparing the products of the present application, and reference is made to that patent for such detailed description and to Examples 1a through 103a of that patent for examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para-substituted phenol or a mixture of the same. Such resins are described also in issued patents, for instance, U. S. Patent No. 2,499,365, dated March 7, 1950, to De Groote and Keiser, such as Example 71a.

It is sometimes desirable to present the resins herein employed in an over-simplified form which has appeared from time to time in the literature, and particularly in the patent literature, for instance, it has been stated that the composition is approximated in an idealized form by the formula

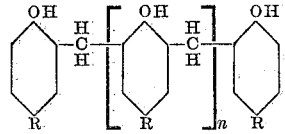

in the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 14 carbon atoms, such as butyl, amyl, hexyl, decyl or dodecyl radical. Where the divalent bridge radical is shown as being derived from formaldehyde, it may, of course, be derived from any other reactive aldehyde having 8 carbon atoms or less.

In the above formula the aldehyde employed in the resin manufacture is formaldehyde. Actually, some other aldehyde such as acetaldehyde, propionaldehyde, or butyraldehyde may be used. The resin unit can be exemplified thus:

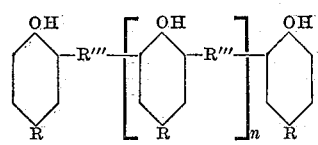

in which R''' is the divalent radical obtained from the particular aldehyde employed to form the resin.

As previously stated, the preparation of resins, the kind herein employed as reactants, is well known. See U. S. Patent No. 2,499,368, dated March 7, 1950, to De Groote and Keiser. Resins can be made using an acid catalyst or basic catalyst or a catalyst showing neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 100th of a percent. Sometimes moderate increase in caustic soda and caustic potash may be used. However the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5; 4.5; or 5.2.

In the actual manufacture of the resins we found no reason for using other than those which are lowest in price and most readily available commercially. For purpose of convenience suitable resins are characterized in the following table:

TABLE I

| Example number | R | Position of R | R''' derived from— | n | Mol. wt. of resin molecule (based on n+2) |
|---|---|---|---|---|---|
| 1a | Phenyl | Para | Formaldehyde. | 3.5 | 992.5 |
| 2a | Tertiary butyl | do | do | 3.5 | 882.5 |
| 3a | Secondary butyl | Ortho | do | 3.5 | 882.5 |
| 4a | Cyclo-hexyl | Para | do | 3.5 | 1,025.5 |
| 5a | Tertiary amyl | do | do | 3.5 | 959.5 |
| 6a | Mixed secondary and tertiary amyl. | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde. | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde. | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde. | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde. | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclo-hexyl | do | do | 1.5 | 646.0 |
| 30a | Hexyl | do | do | 1.5 | 653.0 |
| 31a | do | do | Acetaldehyde. | 1.5 | 688.0 |
| 32a | Octyl | do | do | 1.5 | 786.0 |
| 33a | Nonyl | do | do | 1.5 | 835.0 |
| 34a | Octyl | do | Butyraldehyde. | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde. | 2.0 | 636.0 |
| 38a | Amyl | do | do | 2.0 | 692.0 |
| 39a | Hexyl | do | do | 2.0 | 748.0 |
| 40a | Cyclo-hexyl | do | do | 2.0 | 740.0 |

PART 3

There have been issued a substantial number of patents which give detailed description of the preparation of oxyalkylated derivatives of resins of the kind previously described. For example, see U. S. Patents 2,499,365; 2,499,366; 2,499,367; 2,499,368; and 2,499,370, all dated March 7, 1950, to De Groote and Keiser.

More specifically, a number of other patents have appeared in which the oxyethylation step is given with considerable detail. See, for example, U. S. Patents 2,581,376; 2,581,377; 2,581,378; 2,581,379; 2,581,380; and 2,581,381, all dated January 8, 1952, to De Groote and Keiser. As to further examples, see U. S. Patent 2,602,052, dated July 1, 1952 to De Groote.

The oxypropylation or, for that matter, the treatment of resins with butylene oxide, glycide, or methyl glycide, has been described in the first of the series in the above mentioned patents, i. e., those issued in 1950.

Reference is made to U. S. Patent 2,557,081, dated June 19, 1951 to De Groote and Keiser. This particular patent describes in considerable detail resins which are first treated with propylene oxide and then with ethylene oxide or with ethylene oxide and then propylene oxide or with both oxides simultaneously.

In order to avoid an extensive repetition of what is already described in detail in the patent literature, we are referring to the tables beginning in column 21 of U. S. Patent 2,581,376 and extending through column 36. We have simply numbered these products beginning with 1b, allotting, of course, five numbers to each table beginning with the first table. For convenience these sixteen tables are summarized in the following table:

TABLE II

| Ex. No. | Phenol | Aldehyde | Solvent, lbs. | Resin, lbs. | Ethylene oxide, lbs. |
|---|---|---|---|---|---|
| 1b | Para-tertiary amyl | Formaldehyde | 14.25 | 15.75 | 4.00 |
| 2b | do | do | 10.90 | 12.10 | 15.25 |
| 3b | do | do | 7.13 | 7.93 | 19.69 |
| 4b | do | do | 3.84 | 4.25 | 16.15 |
| 5b | do | do | 1.80 | 2.04 | 10.20 |
| 6b | Nonyl | do | 15.00 | 15.00 | 3.00 |
| 7b | do | do | 10.00 | 10.00 | 9.40 |
| 8b | do | do | 7.27 | 7.27 | 13.70 |
| 9b | do | do | 3.15 | 3.15 | 8.95 |
| 10b | do | do | 2.10 | 2.10 | 8.00 |
| 11b | Para-octyl | do | 14.20 | 15.80 | 3.25 |
| 12b | do | do | 11.10 | 12.40 | 12.50 |
| 13b | do | do | 6.64 | 7.36 | 15.00 |
| 14b | do | do | 4.40 | 4.90 | 14.80 |
| 15b | do | do | 4.10 | 4.58 | 18.52 |
| 16b | do | do | 13.65 | 16.35 | 3.00 |
| 17b | Menthyl | do | 10.00 | 12.00 | 10.75 |
| 18b | do | do | 5.48 | 6.58 | 10.85 |
| 19b | do | do | 4.10 | 4.90 | 13.15 |
| 20b | do | do | 3.10 | 3.72 | 13.43 |
| 21b | Para-secondary butyl | do | 14.45 | 15.55 | 4.25 |
| 22b | do | do | 8.48 | 9.17 | 16.00 |
| 23b | do | do | 4.82 | 5.18 | 14.25 |
| 24b | do | do | 3.85 | 4.15 | 17.00 |
| 25b | do | do | 2.65 | 2.85 | 15.45 |
| 26b | Menthyl | Propionaldehyde | 12.80 | 17.20 | 2.75 |
| 27b | do | do | 8.55 | 11.50 | 9.30 |
| 28b | do | do | 3.77 | 5.08 | 13.10 |
| 29b | do | do | 5.20 | 7.00 | 17.00 |
| 30b | do | do | 2.10 | 2.83 | 9.12 |
| 31b | Para-tertiary amyl | Furfural | 11.20 | 18.00 | 3.50 |
| 32b | do | do | 8.45 | 13.60 | 12.65 |
| 33b | do | do | 4.50 | 8.00 | 14.50 |
| 34b | do | do | 3.42 | 5.48 | 15.10 |
| 35b | do | do | 2.05 | 3.65 | 13.35 |
| 36b | Menthyl | do | 10.25 | 17.75 | 2.50 |
| 37b | do | do | 7.60 | 13.15 | 9.35 |
| 38b | do | do | 4.22 | 6.98 | 10.00 |
| 39b | do | do | 3.76 | 6.24 | 13.25 |
| 40b | do | do | 2.40 | 4.15 | 11.70 |
| 41b | Para-octyl | do | 12.10 | 18.60 | 3.00 |
| 42b | do | do | 9.25 | 14.25 | 11.00 |
| 43b | do | do | 6.72 | 10.32 | 14.91 |
| 44b | do | do | 5.52 | 8.52 | 19.81 |
| 45b | do | do | 1.75 | 2.70 | 8.40 |
| 46b | Para-phenyl | do | 13.90 | 16.70 | 3.00 |
| 47b | do | do | 10.35 | 12.45 | 12.20 |
| 48b | do | do | 8.90 | 10.70 | 19.00 |
| 49b | do | do | 5.20 | 6.26 | 16.64 |
| 50b | do | do | 3.60 | 4.32 | 15.68 |
| 51b | Para-secondary nonyl | do | 10.85 | 20.75 | 3.00 |
| 52b | do | do | 8.28 | 15.85 | 11.77 |
| 53b | do | do | 5.95 | 11.25 | 16.75 |
| 54b | do | do | 4.46 | 8.52 | 19.07 |
| 55b | do | do | 2.57 | 4.93 | 14.50 |
| 56b | | | | | |
| 57b | Para-phenyl | Formaldehyde | 11.00 | 9.00 | 11.75 |
| 58b | | | | | |
| 59b | | | | | |
| 60b | Para-phenyl | | 3.41 | 2.80 | 13.64 |
| 61b | Para-secondary butyl | Furfural | 12.00 | 17.90 | 3.50 |
| 62b | do | do | 9.35 | 13.92 | 13.23 |
| 63b | do | do | 6.25 | 8.95 | 17.00 |
| 64b | do | do | 4.35 | 6.50 | 18.40 |
| 65b | do | do | 3.02 | 4.34 | 16.49 |
| 66b | Para-octyl | Propionaldehyde | 13.30 | 16.90 | 3.00 |
| 67b | do | do | 10.20 | 12.90 | 11.30 |
| 68b | do | do | 6.46 | 8.24 | 16.50 |
| 69b | do | do | 3.86 | 4.87 | 13.02 |
| 70b | do | do | 2.94 | 3.75 | 13.26 |
| 71b | Para-nonyl | do | 10.90 | 18.00 | 3.00 |
| 72b | do | do | 8.25 | 13.60 | 11.50 |
| 73b | do | do | 5.65 | 9.35 | 15.75 |
| 74b | do | do | 3.15 | 5.25 | 13.45 |
| 75b | do | do | 1.94 | 3.21 | 10.65 |
| 76b | Para-tertiary amyl | do | 12.60 | 16.20 | 3.50 |
| 77b | do | do | 9.52 | 12.24 | 12.89 |
| 78b | do | do | 6.50 | 8.30 | 17.75 |
| 79b | do | do | 4.25 | 5.45 | 17.25 |
| 80b | do | do | 2.69 | 3.43 | 14.55 |

NOTE.—For ease of comparison blanks appear in the above table where blanks appear in previously mentioned tables in U. S. Patent 2,581,376.

Oxypropylated derivatives comparable to 1b through 80b as described above can readily be obtained by substituting a molar equivalent amount of propylene oxide, i. e., 56 lbs. of propylene oxide, for example, for each 44 lbs. of ethylene oxide. We have prepared such a similar series but for sake of brevity only a few will be included for purposes of illustration.

TABLE III

| Ex. No. | Oxypropylated analog | Phenol | Aldehyde | Solvent, lbs. | Resin, lbs. | Propylene oxide, lbs. |
|---|---|---|---|---|---|---|
| 1c | 1b | Para-tertiary amyl. | Formaldehyde. | 14.25 | 15.75 | 5.10 |
| 2c | 2b | do | do | 10.90 | 12.10 | 19.40 |
| 3c | 3b | do | do | 7.13 | 7.93 | 25.30 |
| 4c | 4b | do | do | 3.84 | 4.25 | 23.00 |
| 5c | 5b | do | do | 1.80 | 2.04 | 13.00 |
| 66c | 66b | Para-octyl | Propionaldehyde. | 13.30 | 16.90 | 3.82 |
| 67c | 67b | do | do | 10.20 | 12.90 | 14.40 |
| 68c | 68b | do | do | 6.46 | 8.24 | 21.00 |
| 69c | 69b | do | do | 3.86 | 4.87 | 16.60 |
| 70c | 70b | do | do | 2.94 | 3.75 | 16.80 |
| 76c | 76b | Para-tertiary amyl. | Formaldehyde. | 12.60 | 16.20 | 4.46 |
| 77c | 77b | do | do | 9.52 | 12.24 | 16.45 |
| 78c | 78b | do | do | 6.50 | 8.30 | 22.60 |
| 79c | 79b | do | do | 4.25 | 5.45 | 22.00 |
| 80c | 80b | do | do | 2.69 | 3.43 | 18.55 |

As an illustration of oxypropylated resins involving the use of both ethylene and propylene oxide, a reference is made to the aforementioned U. S. Patent 2,557,081, dated June 19, 1951, to De Groote and Keiser. The last table in column 28 of said patent describes in detail the preparation of a series of oxyalkylated resins in which both propylene and ethylene oxide are employed. Simply by illustration, a series of 27 compounds are included, the description of which appears in detail in said aforementioned U. S. Patent 2,577,081, to De Groote and Keiser.

Note the first series of nine compounds, 1d through 9d were prepared with propylene oxide, first and then ethylene oxide. The second nine compounds, 10d through 18d inclusive, were prepared using ethylene oxide first and then propylene oxide, and the last nine compounds, 19d through 27d, were prepared by random oxyalkylation, i. e., using a mixture of the two oxides.

In the preparation of the resins, our preference is to use hydrocarbon substituted phenols, particularly para-substituted, in which the substituted radical R contains 4 to 18 carbon atoms and particularly 4 to 14 carbon atoms. The amount of alkylene oxide introduced may be comparatively large in comparison to the initial resin. For instance, there may be as much as 50 parts by weight of an oxide or mixed oxides used for each part by weight of resin employed.

It will be noted that the various resins referred to in the aforementioned U. S. Patent 2,499,370 are substantially the same type of materials as referred to in Table I. For instance, resin 3a of the table is substantially the same as 2a of the patent; resin 20a of the table is substantially the same as 34a of the patent; and resin 38a of the table is the same as 3a of the patent.

In reaction with polyepoxides, and particularly di-epoxides, a large number of the previously described oxyalkylated resins have been employed. For convenience, the following list is selected indicating the previously described compounds and their molecular weights. Such resins are generally employed as a 50% solution and the polyepoxide employed is a 50% solution, usually both reactants being dissolved in xylene and sufficient sodium methylate added to act as a catalyst, for instance, 1 to 2%.

TABLE IV

| Ex. No. | See U. S. Pat. 2,557,081 Ex. No. in above patent | See U. S. Pat. 2,557,081 Point on graph on above patent | Resin used | Resin, lbs. | Ethylene oxide, lbs. | Propylene oxide, lbs. | Wt. of xylene | Flake caustic soda, ounces |
|---|---|---|---|---|---|---|---|---|
| 1d | A | 1 | Tert. amyl phenol formaldehyde. | 6 | 3 | 1 | 10 | 1 |
| 2d | B | 5 | do | 5 | 4 | 1 | 10 | 1 |
| 3d | C | 8 | do | 3 | 6 | 1 | 10 | 1 |
| 4d | D | 2 | do | 1 | 21.5 | 2.5 | 25 | 2 |
| 5d | E | 9 | do | 1 | 15 | 9 | 25 | 2 |
| 6d | F | 6 | do | 1 | 10 | 15 | 25 | 2 |
| 7d | G | 3 | do | 1 | 2.5 | 21.5 | 25 | 2 |
| 8d | H | 7 | do | 5 | 1 | 4 | 10 | 1 |
| 9d | I | 4 | do | 6 | 1 | 3 | 10 | 1 |
| 10d | A | 1 | Tert. butyl phenol formaldehyde. | 6 | 3 | 1 | 10 | 1 |
| 11d | B | 5 | do | 5 | 4 | 1 | 10 | 1 |
| 12d | C | 8 | do | 3 | 6 | 1 | 10 | 1 |
| 13d | D | 2 | do | 1 | 21.5 | 2.5 | 25 | 2 |
| 14d | E | 9 | do | 1 | 15 | 9 | 25 | 2 |
| 15d | F | 6 | do | 1 | 10 | 14 | 25 | 2 |
| 16d | G | 3 | do | 1 | 2.5 | 21.5 | 25 | 2 |
| 17d | H | 7 | do | 5 | 1 | 4 | 10 | 1 |
| 18d | I | 4 | do | 6 | 1 | 3 | 10 | 1 |
| 19d | A | 1 | Nonyl phenol-formaldehyde. | 6 | 3 | 1 | 10 | 1 |
| 20d | B | 5 | do | 5 | 4 | 1 | 10 | 1 |
| 21d | C | 8 | do | 3 | 6 | 1 | 10 | 1 |
| 22d | D | 2 | do | 1 | 21.5 | 2.5 | 25 | 2 |
| 23d | E | 9 | do | 1 | 15 | 9 | 25 | 2 |
| 24d | F | 6 | do | 1 | 10 | 14 | 25 | 2 |
| 25d | G | 3 | do | 1 | 2.5 | 21.5 | 25 | 2 |
| 26d | H | 7 | do | 5 | 1 | 4 | 10 | 1 |
| 27d | I | 4 | do | 6 | 1 | 3 | 10 | 1 |

TABLE V

| Example number | Molecular weight |
|---|---|
| 1b | 1,202 |
| 2b | 2,169 |
| 3b | 3,339 |
| 4b | 4,609 |
| 5b | 5,749 |
| 6b | 1,509 |
| 7b | 2,466 |
| 8b | 3,657 |
| 9b | 5,867 |
| 10b | 6,087 |
| 1c | 1,270 |
| 2c | 2,494 |
| 3c | 4,019 |
| 4c | 6,139 |
| 5c | 7,079 |
| 1d | 1,697 |
| 2d | 1,918 |
| 3d | 3,189 |
| 4d | 23,959 |
| 5d | 23,959 |
| 6d | 24,909 |
| 7d | 23,959 |
| 8d | 1,918 |
| 9d | 1,697 |

PART 4

Subdivision A

As previously pointed out, having the two types of reactants, i. e., the oxyalkylated phenol-aldehyde resins and the diglycidyl ethers or their equivalent, one can then proceed with either a single step reaction combining 4 moles of the oxyalkylated derivative with 3 moles of the diglycidyl ether or else one can employ a 2-step process in which one first combines 2 moles of the oxyalkylated phenol-aldehyde resin with one mole of the ether and then subsequently combines this product, which may be considered as an intermediate, with another mole of ether in the combination of 2 moles of the intermediate plus one mole of diglycidyl ether. For reasons previously indicated the instant part, i. e., Subdivision A, is concerned with a 2-step process. As previously pointed out, in the 2-step process the reactions which result in the formation of an intermediate involve two moles of an oxyalkylated phenol-aldehyde resin of the kind previously described and one mole of a diglycidyl ether as specified. The reaction is essentially an oxyalkylation reaction and thus may be considered as merely a continuance of the previous oxyalkylation reaction involving a monoepoxide as differentiated from a polyepoxide and particularly a diepoxide. The reactions take place in substantially the same way, i. e., by the opportunity to react at somewhere above the boiling point of water and below the point of decomposition, for example, 130–185° C. in the presence of a small amount of alkaline catalyst. Since the polyepoxide is non-volatile as compared, for example, with ethylene oxide, the reaction is comparatively simple. Purely from a mechanical standpoint it is a matter of convenience to conduct both classes of reactions in the same equipment. In other words, after the phenol-aldehyde resin has been reacted with ethylene oxide, propylene oxide or the like, it is subsequently reacted with a polyepoxide. The polyepoxide reaction can be conducted in an ordinary reaction vessel such as the usual glass laboratory equipment. This is particularly true of the kind used for resin manufacture as described in a number of patents, as for example, U. S. Patent No. 2,499,365. One can use a variety of catalysts in connection with the polyepoxide of the same class employed with monoepoxide. In fact, the reaction will go at an extremely slow rate without any catalyst at all. The usual catalyst include alkaline materials such as caustic soda, caustic potash, sodium methylate, etc. Other catalysts may be acidic in nature and are of the kind characterized by iron and tin chlorides. Furthermore, insoluble catalysts such as clays or specially prepared mineral catalysts have been used. For practical purposes, it is best to use the same catalyst as is used in the initial oxyalkylation step and in many cases there is sufficient residual catalyst to serve for the reaction involving the second oxyalkylation step, i. e., the polyepoxide. For this reason, we have preferred to use a small amount of finely divided caustic soda or sodium methylate as the initial catalyst and also the catalyst in the second stage. The amount generally employed is 1, 2 or 3% of these alkaline catalysts.

Actually, the reactions of polyepoxides with various resin materials have been thoroughly described in the literature and the procedure is, for all purposes, the same as with glycide which has been described previously.

It goes without saying that the reaction involving the polyepoxide can be conducted in the same manner as the monoepoxide as far as the presence of an inert solvent is concerned, i. e., one that is not oxyalkylation-susceptible. Generally speaking, this is most conveniently an aromatic solvent such as xylene or a higher boiling coal tar solvent, or else a similar high boiling aromatic solvent obtained from petroleum. One can employ an oxygenated solvent such as the diethylether of ethylene glycol, or the diethylether of propylene glycol, or similar ethers, either alone or in combination with a hydrocarbon solvent. The solvent so selected should be one which, of course, is suitable in the oxyalkylation step involving the monoepoxides described subsequently. The solvent selected may depend on the ability to remove it by subsequent distillation if required. Here again it has been our preference to have a solvent present in the oxyalkylation involving the initial stage and permitting the solvent to remain. The amount of solvent may be insignificant, depending whether or not exhaustive oxypropylation is employed. However, since the oxypropylated phenolaldehyde resins are almost invariably liquids there is no need for the presence of a solvent as when oxyalkylation involves a solid which may be rather high melting. Thus, it is immaterial whether there is solvent present or not and it is immaterial whether solvent was added in the first stage of axyalkylation or not, and also it is immaterial whether there was solvent present in the second stage of oxyalkylation or not. The advantage of the presence of solvent is that sometimes it is a convenient way of controlling the reaction temperature and thus in the subsequent examples we have added sufficient xylene so as to produce a mixture which boils somewhere in the neighborhood of 125° to 140° C. and removes xylene so as to bring the boiling point of the mixture to about 140° C. during part of the reaction and subsequently removing more xylene so that the mixture refluxed at somewhere between 170° to 190° C. This was purely a convenience and need not be employed unless desired.

Example 1e

The oxyalkylated resin employed was the one previously identified as 2b, having a molecular weight of 2169; the amount employed was 217 grams. The resin was dissolved in approximately an equal weight of xylene. The mixture was heated to just short of the boiling point of water, i. e., a little below 100° C. Approximately one half percent of sodium methylate was added, or, more exactly, 1.1 grams. The stirring was continued until there was a solution or distribution of the catalyst. The mixture was heated to a little past 100° C. and left at this temperature while 18.5 grams of the diepoxide (previously identified as A), dissolved in an equal weight of xylene, were added. After the diepoxide was added the temperature was permitted to rise to approximately 109° C. The time required to add the diepoxide was approximately one-half hour. The temperature rose in this period to about 127° C. The temperature rise was controlled by allowing the xylene to reflux over and to separate out the xylene by a phase separating trap. In any event, the temperature was raised shortly to 148–150° C. and allowed to reflux at this temperature for almost three hours. Tests indicated that the reaction was complete at the end of this time; in fact, it probably was complete at a considerably earlier stake. The xylene which had been separated out was returned to the mixture so that the reaction mass at the end of the procedure represented about 50% reaction product and 50% solvent. The procedure employed is, of course, simple in light of what has been said previously; in fact, it corresponds to the usual procedure employed in connection with an oxyalkylating agent such as glycide, i. e., a non-volatile oxyalkylating agent. At the end of the reaction period the mass obtained was a dark, viscous mixture. It could be bleached, of course, by use of charcoal, filtering earths, or the like.

Various examples obtained in substantially the same manner as employed are described in the following tables:

If the intermediate is to be converted immediately from the 2:1 ratio to the 4:3 ratio then in that event there is no need to neutralize the catalyst present. Indeed, such catalyst is taken into consideration in calculating the amount of catalyst present. In other words, one need not add as much catalyst when the residual catalyst is present as one would have to add if it had been previously neutralized.

Reference to the 4:3 ratio means there can be some variation within reasonable limits, for instance, several percent one way or the other. In other words, one could use, for example, 3.9 or 4.1 moles instead of 4 moles, or one might use 2.9 or 3.1 moles instead of 3 moles. As the molal ratio of the polyepoxide to oxyalkylated resin increases, i. e., approaches a 1:1 ratio there is greater opportunity for cross-linking or side reaction; or, stated another way, gelation is more apt to take place. This is

TABLE VI

| Ex. No. | Oxyalkylated resin | Amt., gms. | Diepoxide used | Amt., gms. | Catalyst (NaOCH$_3$), grams | Xylene, gms. | Molar ratio | Time of reaction, hrs. | Max. temp., °C. | Color and physical state |
|---|---|---|---|---|---|---|---|---|---|---|
| 1c | 2b | 217 | A | 18.5 | 1.1 | 235.5 | 2:1 | 3 | 150 | Dark, viscous mass. |
| 2c | 4b | 460 | A | 18.5 | 2.3 | 478.5 | 2:1 | 4 | 155 | Do. |
| 3c | 7b | 247 | A | 18.5 | 1.3 | 265.5 | 2:1 | 3 | 152 | Do. |
| 4c | 10b | 609 | A | 18.5 | 3.1 | 627.5 | 2:1 | 5 | 158 | Do. |
| 5c | 2c | 249 | A | 18.5 | 1.3 | 267.5 | 2:1 | 3 | 145 | Do. |
| 6c | 3c | 402 | A | 18.5 | 2.1 | 420.5 | 2:1 | 4 | 150 | Do. |
| 7c | 5c | 708 | A | 18.5 | 3.6 | 726.5 | 2:1 | 5 | 156 | Do. |
| 8c | 2d | 192 | A | 18.5 | 1.0 | 210.5 | 2:1 | 3 | 150 | Do. |
| 9c | 3d | 319 | A | 18.5 | 1.6 | 337.5 | 2:1 | 3 | 152 | Do. |
| 10c | 6d | 249 | A | 1.9 | 1.2 | 251.0 | 2:1 | 3 | 155 | Do. |
| 1d | 2b | 217 | B | 11.0 | 1.1 | 228.0 | 2:1 | 3 | 148 | Do. |
| 2d | 4b | 460 | B | 11.0 | 2.3 | 471.0 | 2:1 | 4 | 150 | Do. |
| 3d | 7b | 247 | B | 11.0 | 1.2 | 258.0 | 2:1 | 3 | 145 | Do. |
| 4d | 10b | 609 | B | 11.0 | 3.1 | 620.0 | 2:1 | 5 | 155 | Do. |
| 5d | 2c | 249 | B | 11.0 | 1.3 | 260 | 2:1 | 3 | 142 | Do. |
| 6d | 3c | 402 | B | 11.0 | 2.0 | 413 | 2:1 | 4 | 150 | Do. |
| 7d | 5c | 708 | B | 11.0 | 3.5 | 719 | 2:1 | 5 | 155 | Do. |
| 8d | 2d | 192 | B | 11.0 | 1.0 | 203 | 2:1 | 3 | 148 | Do. |
| 9d | 3d | 319 | B | 11.0 | 1.6 | 330 | 2:1 | 3 | 150 | Do. |
| 10d | 6d | 249 | B | 1.1 | 1.2 | 250 | 2:1 | 3 | 150 | Do. |

TABLE VII

| Ex. No. | Oxyalkylated resin used | Probable molecular wt. of reaction product | Amount of product, grams | Amount of solvent, grams |
|---|---|---|---|---|
| 1c | 2b | 4,710 | 4,710 | 2,355 |
| 2c | 4b | 9,570 | 4,785 | 2,390 |
| 3c | 7b | 5,310 | 5,310 | 2,655 |
| 4c | 10b | 12,550 | 6,275 | 3,128 |
| 5c | 2c | 5,350 | 5,350 | 2,675 |
| 6c | 3c | 8,410 | 4,200 | 2,100 |
| 7c | 5c | 14,530 | 7,265 | 3,632 |
| 8c | 2d | 4,210 | 4,210 | 2,100 |
| 9c | 3d | 6,750 | 6,750 | 3,375 |
| 10c | 6d | 50,190 | 5,020 | 2,510 |
| 1d | 2b | 4,560 | 4,560 | 2,280 |
| 2d | 4b | 9,420 | 4,710 | 2,355 |
| 3d | 7b | 5,160 | 5,150 | 2,570 |
| 4d | 10b | 12,400 | 6,200 | 3,100 |
| 5d | 2c | 5,200 | 5,200 | 2,600 |
| 6d | 3c | 8,260 | 4,130 | 2,065 |
| 7d | 5c | 14,380 | 7,190 | 3,590 |
| 8d | 2d | 4,060 | 4,060 | 2,030 |
| 9d | 3d | 6,600 | 6,600 | 3,300 |
| 10d | 6d | 50,040 | 5,000 | 2,500 |

In some instances there seems to be a change takes place after the intermediate is allowed to stand for some period of time with the residual catalyst present. The nature of this change is not well defined but it may be due to the fact that there is present a small amount of the polyepoxide unreacted, which reacts slowly. As a rule, when the intermediate is to be stored for a period of time and then perhaps subjected to reaction with the same polyepoxide or perhaps a different polyepoxide of the same general kind, we prefer to neutralize the added caustic by the addition of a small amount of hydrochloric acid, sulphuric acid, phosphoric acid, or an organic acid such as toluene sulfonic acid. A polydecylated benzene sulphonic is suitable.

true of a polyepoxide which includes free hydroxyl groups to a greater degree than one which does not contain free hydroxyl groups.

Note that in Table VIII temperatures varied as high as 160° to 165° C. On the other hand in Table X where a single-step process is used the temperature employed was between 80° and 90° C. The reason is merely that it is desirable to use the lowest temperatures which give complete reaction based on the particular reactants employed. In many instances and in fact in most instances 80° to 90° C. is sufficient although higher temperatures can be employed provided there is no gelation or cross-linking and provided there is no objection to a somewhat darker color. Everything else being equal additional solvent tends to reduce cross-linking and, in any event, when the reaction is complete it is preferable to eliminate alkalinity in the manner described above.

*Example 1e*

There is merely a continuation so as to change the reactant ratio in a previous derivative, to wit, Example 1c described above. Example 1c, and other comparable compounds are conveniently referred to as "polyepoxide-derived intermediate products." In any event, 235.5 grams of this material dissolved in 244.8 grams of xylene, along with a total of 2.4 grams of sodium methylate as a catalyst, were treated in exactly the same manner as previously described, with 9.3 grams of diepoxide A. This is a molal ratio of 2:1 based on the intermediate to the diepoxide. The reaction time was two hours and a maximum temperature of 150° C. was employed. The resultant product was a dark viscous mass.

Similar derivatives were obtained using other intermediates and also using diepoxide B previously described, all of which is summarized in the two tables following, to wit, Tables VIII and IX.

TABLE VIII

| Ex. No. | Polyepoxide derived intermediate product | Amt., gms. | Diepoxide used | Amt., gms. | Catalyst (NaOCH₃), gms. | Xylene, gms. | Molar ratio | Time of reaction, hrs. | Max. temp., °C. | Color and physical state |
|---|---|---|---|---|---|---|---|---|---|---|
| 1e | 1c | 235.5 | A | 9.3 | 2.4 | 244.8 | 2:1 | 2 | 120 | Dark viscous mass. |
| 2e | 2c | 478.5 | A | 9.3 | 4.8 | 487.8 | 2:1 | 2 | 140 | Do. |
| 3e | 3c | 265.5 | A | 9.3 | 2.7 | 274.8 | 2:1 | 2 | 155 | Do. |
| 4e | 4c | 627.5 | A | 9.3 | 6.3 | 636.8 | 2:1 | 2 | 160 | Do. |
| 5e | 5c | 267.5 | A | 9.3 | 2.7 | 276.8 | 2:1 | 2 | 152 | Do. |
| 6e | 6c | 420.0 | A | 9.3 | 4.3 | 429.3 | 2:1 | 2 | 158 | Do. |
| 7e | 7c | 726.5 | A | 9.3 | 7.3 | 735.8 | 2:1 | 2 | 154 | Do. |
| 8e | 8c | 210.5 | A | 9.3 | 2.2 | 219.8 | 2:1 | 2 | 150 | Do. |
| 9e | 9c | 337.5 | A | 9.3 | 3.4 | 346.8 | 2:1 | 2 | 158 | Do. |
| 10e | 10c | 501.9 | A | 1.9 | 5.0 | 503.8 | 2:1 | 2 | 162 | Do. |
| 1f | 1d | 228.0 | B | 5.5 | 2.3 | 233.5 | 2:1 | 2 | 160 | Do. |
| 2f | 2d | 471.0 | B | 5.5 | 4.7 | 476.5 | 2:1 | 2 | 162 | Do. |
| 3f | 3d | 258.0 | B | 5.5 | 2.6 | 263.5 | 2:1 | 2 | 165 | Do. |
| 4f | 4d | 620.0 | B | 5.5 | 6.2 | 625.5 | 2:1 | 2 | 158 | Do. |
| 5f | 5d | 260.0 | B | 5.5 | 2.6 | 265.5 | 2:1 | 2 | 160 | Do. |
| 6f | 6d | 413.0 | B | 5.5 | 4.2 | 418.5 | 2:1 | 2 | 160 | Do. |
| 7f | 7d | 719.0 | B | 5.5 | 7.2 | 724.5 | 2:1 | 2 | 165 | Do. |
| 8f | 8d | 203.0 | B | 5.5 | 2.1 | 208.5 | 2:1 | 2 | 166 | Do. |
| 9f | 9d | 330.0 | B | 5.5 | 3.4 | 335.5 | 2:1 | 2 | 162 | Do. |
| 10f | 10d | 500.4 | B | 1.1 | 5.0 | 501.5 | 2:1 | 2 | 165 | Do. |

TABLE IX

| Ex. No. | Oxyalkylated resin used | Probable molec. wt. of reaction product | Amount of Product, grams | Amount of Solvent, grams |
|---|---|---|---|---|
| 1e | 1c | 9,790 | 4,895 | 2,448 |
| 2e | 2c | 19,510 | 3,902 | 1,951 |
| 3e | 3c | 10,990 | 2,198 | 1,099 |
| 4e | 4c | 25,470 | 5,094 | 2,547 |
| 5e | 5c | 11,070 | 2,214 | 1,107 |
| 6e | 6c | 17,190 | 3,438 | 1,719 |
| 7e | 7c | 29,430 | 5,886 | 2,943 |
| 8e | 8c | 8,790 | 4,395 | 2,198 |
| 9e | 9c | 13,870 | 2,774 | 1,387 |
| 10e | 10c | 100,750 | 4,030 | 2,015 |
| 1f | 1d | 9,340 | 4,670 | 2,335 |
| 2f | 2d | 19,060 | 3,812 | 1,906 |
| 3f | 3d | 10,540 | 2,108 | 1,054 |
| 4f | 4d | 25,020 | 5,004 | 2,502 |
| 5f | 5d | 10,620 | 2,124 | 1,062 |
| 6f | 6d | 16,740 | 3,348 | 1,674 |
| 7f | 7d | 28,980 | 5,796 | 2,898 |
| 8f | 8d | 8,340 | 4,170 | 2,085 |
| 9f | 9d | 13,400 | 2,680 | 1,340 |
| 10f | 10d | 100,300 | 4,012 | 2,006 |

*Example 1ee*

This is a one-step procedure which in essence produces the same end products as in the case of Example 1e in Table VIII, preceding. 217 grams of the oxyalkylated resin previously identified as Example 2b, were reacted with 27.8 grams of diepoxide A. The amount of catalyst used was 1.3 grams of sodium methylate. The amount of xylene used was 235.5 grams. The molal ratio of oxyalkylated resin to diepoxide was 4:3. The reaction time was approximately 3.5 hours. The maximum temperature employed was 84° C. The end product, of course, was substantially the same as that obtained under the heading of Example 1e, preceding. For this reason no additional data are included in regard to probable molecular weight, etc., as appeared in Table IX, for the reason that it is in essence identical as far as Example 1e is concerned and similarly, the data in regard to Example 2ee in Table X are substantially identical in regard to Example 2e in Table IX.

TABLE X

| Ex. No. | Oxyalkylated resin | Amt., gms. | Diepoxide used | Amt., gms. | Catalyst (NaOCH₃), gms. | Xylene, gms. | Molar ratio | Time of reaction, hrs. | Max. temp., °C. | Color and physical state |
|---|---|---|---|---|---|---|---|---|---|---|
| 1ee | 2b | 217 | A | 27.8 | 1.3 | 235.5 | 4:3 | 3.5 | 84 | Dark, viscous mass. |
| 2ee | 4b | 460 | A | 27.8 | 2.5 | 478.5 | 4:3 | 4.5 | 85 | Do. |
| 3ee | 7b | 247 | A | 27.8 | 1.5 | 265.5 | 4:3 | 4.0 | 85 | Do. |
| 4ee | 10b | 609 | A | 27.8 | 3.2 | 627.5 | 4:3 | 5.0 | 88 | Do. |
| 5ee | 2c | 249 | A | 27.8 | 1.4 | 267.5 | 4:3 | 3.5 | 87 | Do. |
| 6ee | 3c | 402 | A | 27.8 | 2.4 | 420.5 | 4:3 | 4.0 | 83 | Do. |
| 7ee | 5c | 708 | A | 27.8 | 3.6 | 726.5 | 4:3 | 4.5 | 82 | Do. |
| 8ee | 2d | 192 | A | 27.8 | 1.2 | 210.5 | 4:3 | 4.0 | 81 | Do. |
| 9ee | 3d | 319 | A | 27.8 | 1.8 | 337.5 | 4:3 | 5.0 | 85 | Do. |
| 10ee | 6d | 249 | A | 2.8 | 1.4 | 251.0 | 4:3 | 4.5 | 84 | Do. |

*Subdivision B*

As previously noted, there is no need to employ a 2-stage procedure except to the extent that it is convenient. For instance, it would be convenient if a different polyepoxide were used in the second stage. However, as far as employing the 4:3 ratio of reactants instead of the 2:1 as a single step, it seems no description is necessary because the procedure would be obvious in light of what has been said. However, as an illustration, a number of examples will be included.

PART 5

As to the use of conventional demulsifying agents reference is made to U. S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Examples 1e or 1ee, herein described.

Having thus described our invention, what we claim as new and desire to secure by Letters Patent, is:

1. A process for breaking petroleum emulsions of the water-in-oil type, characterized by subjecting the emulsions to the action of a demulsifier including synthetic hydrophile products; said synthetic hydrophile products being the reaction products of (A) an oxyalkylated phenol-aldehyde resin containing a plurality of active hydrogen atoms, and (B) a non-aryl hydrophile polyepoxide characterized by the fact that the precursory polyhydric alcohol, in which an oxygen-linked hydrogen atom is replaced subsequently by the radical

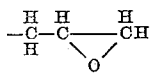

in the polyepoxide, is water-soluble; said polyepoxides being free from reactive functional groups other than epoxy and hydroxyl groups and characterized by the fact that the divalent linkage uniting the terminal oxirane rings is free from any radical having more than 4 uninterrupted carbon atoms in a single chain; said oxyalkylated phenol-aldehyde resins, reactant (A) being the products derived by oxyalkylation involving (aa) an alpha-beta alkylene oxide having not more than 4 carbon atoms and selected from the class consisting of ethylene oxide, propylene oxide, butylene oxide, glycide, and methylglycide, and (bb) an oxyalkylation-susceptible fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

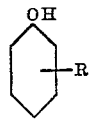

in which R is a hydrocarbon radical having not more than 24 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, hydroxypropylene radicals, and hydroxybutylene radicals, and $n$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of four moles of (A) to three moles of (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

2. A process for breaking petroleum emulsions of the water-in-oil type, characterized by subjecting the emulsion to the action of a demulsifier including synthetic hydrophile products; said synthetic hydrophile products being the reaction products of (A) an oxyalkylated phenol-aldehyde resin containing a plurality of active hydrogen atoms, and (B) a non-aryl hydrophile polyepoxide characterized by the fact that the precursory polyhydric alcohol, in which an oxygen-linked hydrogen atom is replaced subsequently by the radical

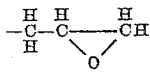

in the polyepoxide, is water-soluble said polyepoxides being free from reactive functional groups other than epoxy and hydroxyl groups and characterized by the fact that the divalent linkage uniting the terminal oxirane rings is free from any radical having more than 4 uninterrupted carbon atoms in a single chain; said polyepoxides being characterized by having present not more than 20 carbon atoms; said oxyalkylated phenol-aldehyde, resins reactant (A) being the products derived by oxyalkylation involving (aa) an alpha-beta alkylene oxide having not more than 4 carbon atoms and selected from the class consisting of ethylene oxide, propylene oxide, butylene oxide, glycide, and methylglycide, and (bb) an oxyalkylation-susceptible fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

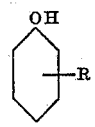

in which R is a hydrocarbon radical having not more than 24 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, hydroxypropylene radicals, and hydroxybutylene radicals, and $n$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of four moles of (A) to three moles of (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

3. A process for breaking petroleum emulsions of the water-in-oil type, characterized by subjecting the emulsion to the action of a demulsifier including synthetic hydrophile products; said synthetic hydrophile products being the reaction products of (A) an oxyalkylated phenol-aldehyde resin containing a plurality of active hydrogen atoms, and (B) a non-aryl hydrophile diepoxide characterized by the fact that the precursory polyhydric alcohol, in which an oxygen-linked hydrogen atom is replaced subsequently by the radical

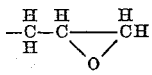

in the diepoxide, is water-soluble; said diepoxides being free from reactive functional groups other than epoxy and hydroxyl groups and characterized by the fact that the divalent linkage uniting the terminal oxirane rings is free from any radical having more than 4 uninterrupted carbon atoms in a single chain; said diepoxides being characterized by having present not more than 20 carbon atoms; said oxylated phenol-aldehyde, resins reactant (A) being the products derived by oxyalkylation involving (aa) an alpha-beta alkylene oxide having not more than 4 carbon atoms and selected from the class consisting of ethylene oxide, propylene oxide, butylene oxide, glycide, and methylglycide, and (bb) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

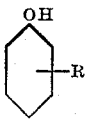

in which R is a hydrocarbon radical having not more than 24 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, hydroxypropylene radicals, and hydroxybutylene radicals, and $n$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of four moles of (A) to three moles of (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

4. The process of claim 3 wherein the diepoxide contains at least one reactive hydroxyl radical.

5. A proces for breaking petroleum emulsions of the water-in-oil type, characterized by subjecting the emulsion to the action of a demulsifier including synthetic hydrophile products; said synthetic hydrophile products being the reaction products of (A) an oxyalkylated phenol-aldehyde resin containing a plurality of active hydrogen atoms, and (B) a hydroxylated diepoxy polyglycerol having not over 20 carbon atoms; said oxyalkylated phenol-aldehyde resin, reactant (A) being the product derived by oxyalkylation involving (aa) an alpha-beta alkylene oxide having not more than 4 carbon atoms and selected from the class consisting of ethylene oxide, propylene oxide, butylene oxide, glycide, and methylglycide, and (bb) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

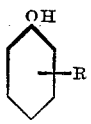

in which R is a hydrocarbon radical having not more than 24 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, hydroxypropylene radicals, and hydroxybutylene radicals, and $n$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of four moles of (A) to three moles of (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

6. The process of claim 5 wherein the polyglycerol derivative has not over 8 glycerol nuclei.

7. The proceoss of claim 5 wherein the polyglycerol derivative has not over 5 glycerol nuclei, and the precursory phenol is para-substituted.

8. The process of claim 5 wherein the polyglycerol derivative has not over 5 glycerol nuclei, and the precursory phenol is para-substituted and contains at least 4 and not over 18 carbon atoms in the substituent group.

9. The process of claim 5 wherein the polyglycerol derivative has not over 5 glycerol nuclei, and the precursory phenol is para-substituted and contains at least 4 and not over 14 carbon atoms in the substituent group, and the precursory aldehyde is formaldehyde.

10. The process of claim 5 wherein the polyglycerol derivative has not over 5 glycerol nuclei, and the precursory phenol is para-substituted and contains at least 4 and not over 14 carbon atoms in the substituent group, and the precursory aldehyde is formaldehyde, and the total number of phenolic nuclei in the initial resin is not over 5.

11. The process of claim 1 with the proviso that the hydrophile properties of the polyepoxide-derived product in an equal weight of xylene, are sufficient to produce an emulsion when said xylene solution is shaken vigorously with 1 to 3 volumes of water.

12. The process of claim 2 with the proviso that the hydrophile properties of the polyepoxide-derived product in an equal weight of xylene, are sufficient to produce an emulsion when said xylene solution is shaken vigorously with 1 to 3 volumes of water.

13. The process of claim 3 with the proviso that the hydrophile properties of the polyepoxide-derived product in an equal weight of xylene, are sufficient to produce an emulsion when said xylene solution is shaken vigorously with 1 to 3 volumes of water.

14. The process of claim 4 with the proviso that the hydrophile properties of the polyepoxide-derived product in an equal weight of xylene, are sufficient to produce an emulsion when said xylene solution is shaken vigorously with 1 to 3 volumes of water.

15. The process of claim 5 with the proviso that the hydrophile properties of the polyepoxide-derived product in an equal weight of xylene, are sufficient to produce an emulsion when said xylene solution is shaken vigorously with 1 to 3 volumes of water.

16. The process of claim 6 with the proviso that the hydrophile properties of the polyepoxide-derived product in an equal weight of xylene, are sufficient to produce an emulsion when said xylene solution is shaken vigorously with 1 to 3 volumes of water.

17. The process of claim 7 with the proviso that the hydrophile properties of the polyepoxide-derived product in an equal weight of xylene, are sufficient to produce an emulsion when said xylene solution is shaken vigorously with 1 to 3 volumes of watere.

18. The process of claim 8 with the proviso that the hydrophile properties of the polyepoxide-derived product in an equal weight of xylene, are sufficient to produce an emulsion when said xylene solution is shaken vigorously with 1 to 3 volumes of water.

19. The process of claim 9 with the proviso that the hydrophile properties of the polyepoxide-derived product in an equal weight of xylene, are sufficient to produce an emulsion when said xylene solution is shaken vigorously with 1 to 3 volumes of water.

20. The process of claim 10 with the proviso that the hydrophile properties of the polyepoxide-derived product in an equal weight of xylene, are sufficient to produce an emulsion when said xylene solution is shaken vigorously with 1 to 3 volumes of water.

References Cited in the file of this patent

UNITED STATES PATENTS

| | | |
|---|---|---|
| 2,454,541 | Bock et al. | Nov. 23, 1948 |
| 2,454,545 | Bock et al. | Nov. 23, 1948 |
| 2,499,365 | De Groote et al. | Mar. 7, 1950 |
| 2,507,910 | Keiser et al. | May 16, 1950 |
| 2,558,688 | Landa | June 26, 1951 |
| 2,602,052 | De Groote | July 1, 1952 |
| 2,615,853 | Kirkpatrick et al. | Oct. 28, 1952 |